US006560467B1

(12) United States Patent
Kim

(10) Patent No.: US 6,560,467 B1
(45) Date of Patent: May 6, 2003

(54) MOBILE PHONE PROVIDED WITH A DEVICE FOR NOTIFYING THE USER OF THE RECEPTION OF A CALL SIGNAL AND METHOD THEREFOR

(75) Inventor: Ki-Hyun Kim, Suwon-shi (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/448,131

(22) Filed: Nov. 24, 1999

(30) Foreign Application Priority Data

Nov. 25, 1998 (KR) .............................. 98-50792

(51) Int. Cl.$^7$ ................................ H04M 1/00
(52) U.S. Cl. .................... 455/567; 455/90; 455/550; 455/575
(58) Field of Search ............... 340/407.1, 7.6, 340/815.62, 815.64, 815.71, 815.86, 815.87; 310/81, 156.38; 429/96; 455/567, 550, 575, 90

(56) References Cited

U.S. PATENT DOCUMENTS

| 5,668,423 | A | * | 9/1997 | You et al. ............... 310/156.38 |
| 5,787,168 | A | * | 7/1998 | Lien ............................ 340/7.6 |
| 5,956,622 | A | * | 9/1999 | Lee .......................... 340/407.1 |
| 6,304,170 | B1 | * | 10/2001 | Armstrong et al. ........... 310/81 |
| 6,355,374 | B1 | * | 3/2002 | Wirsching ................... 429/96 |

* cited by examiner

Primary Examiner—Thanh Cong Le
Assistant Examiner—Tsuleun Richard Lei
(74) Attorney, Agent, or Firm—Dilworth & Barrese, LLP

(57) ABSTRACT

A device provided in a mobile phone for notifying the user of the receiving of a call signal, includes a vibrator having a rotor mounted in the body of the mobile phone to make a vibration tangibly sensed by the user when the call signal is received by the mobile phone, a battery pack detachably attached to the body to supply power to the mobile phone, and a protrusion formed on the outer surface of the battery pack at the weight center of the mobile phone. Thus, the mobile phone placed on a surface is rotated about the protrusion upon receiving the call signal.

7 Claims, 3 Drawing Sheets

MOBILE PHONE PROVIDED WITH A DEVICE FOR NOTIFYING THE USER OF THE RECEPTION OF A CALL SIGNAL AND METHOD THEREFOR

BACKGROUND OF THE INVENTION

1. Field of the Invention

The present invention relates to a mobile phone such as CT-2, PCS, cellular phone, etc., and more particularly a device for notifying the user of a mobile phone of the reception of a call signal.

2. Description of the related art

The conventional mobile phone is usually designed to notify the user of the reception of a call signal in two ways, one of which is to use a vibrator to make a vibration tangibly sensed, and the other to use an alarm to generate an alarm sound audibly sensed. However, when the user does not carry the mobile phone, or it is placed at a distance such that the user cannot visibly or audibly perceive the vibration or alarm signal, the mobile phone does not have any other means to notify the user of the reception of a call signal.

SUMMARY OF THE INVENTION it is an object of the present invention to provide a mobile phone with a device for visibly notifying the user of the reception of a call signal even when the mobile phone set to the vibration mode is placed at a distance, and method therefore.

It is another object of the present invention to provide a mobile phone with a device that causes the mobile phone set to the vibration mode to rotate about the weight center of the mobile phone to visibly notify the user of the reception of a call signal.

According to an embodiment of the present invention, a device provided in a mobile phone for notifying the user of the reception of a call signal, comprises a vibrator having a rotor mounted in the body of the mobile phone to make a vibration tangibly sensed by the user when the call signal is received by the mobile phone, a battery pack detachably attached to the body to supply power to the mobile phone, and a protrusion formed on the outer surface of the battery pack at the weight center of the mobile phone, whereby the mobile phone is rotated about the protrusion upon receiving the call signal.

According to another embodiment of the present invention, there is provided a method of notifying the user of the reception of a call signal in a mobile phone having a vibrator, which comprises the steps of causing the vibrator to make a vibration tangibly or audibly sensed by the user when the mobile phone set to the vibration mode receives a call signal, and making the mobile phone rotate about a protrusion due to the vibration so as to visibly notify the user of the reception of the call signal.

The present invention will now be described more specifically with reference to the drawings attached by way of example.

DETAILED DESCRIPTION OF THE PREFERRED EMBODIMENTS

Figure 1:
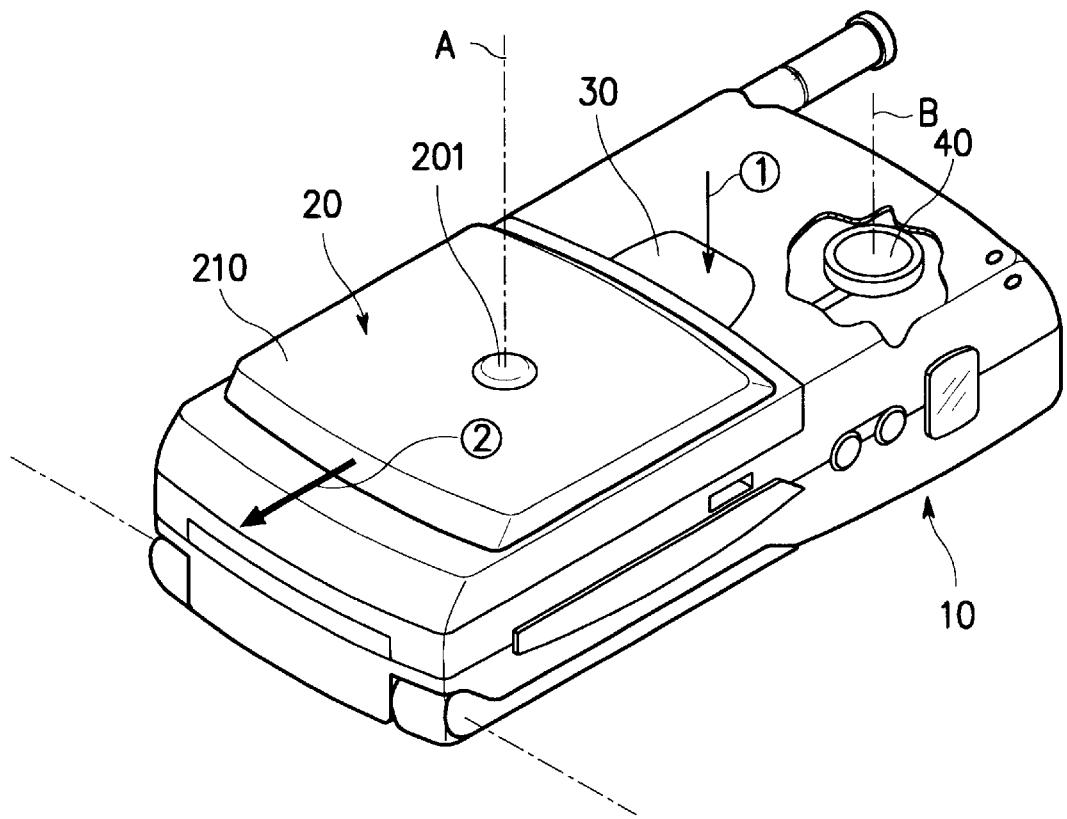
FIG. 1 is a perspective view for illustrating a mobile phone attached with a battery pack according to the present invention.

Throughout the attached drawings, similar reference numerals are used to represent the same or similar functional elements, and there is omitted detailed description of the parts not directly connected with the invention in order to clarify its technical concept.

Figure 2:
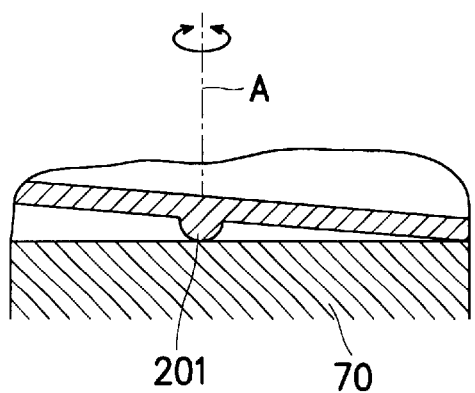
FIG. 2 is a cross sectional view for illustrating a protrusion formed on the outer surface of the battery pack according to the present invention.

Referring now to FIGS. 1 and 2, a battery pack 20 is detachably attached to the underside of the body 10 of a mobile phone such as a cellular phone. It may be attached or detached to the body 10 by a locker 30. More specifically, it may be detached from the body 10 by pulling it in the direction of arrow ② while pressing locker 30 in the direction of arrow ①, and attached to the body 10 by pushing it in the opposite direction of arrow ②.

The mobile phone is also provided with a vibrator 40 consisting of a coin-type or cylinder-type motor having a rotor (not shown). In the present embodiment, the coin-type motor is preferably used. The battery pack 20 has a protrusion 201 formed on its outer surface at the weight center of mobile phone 10. When the mobile phone receives a call signal in vibration mode, the rotor rotates about its central axis "B" to make a vibration imparted to the body 10 of the mobile phone. In this case, if the user carries the mobile phone, he tangibly senses the vibration. However, if the mobile phone is placed on a flat surface 70 such as the surface of a desk, the mobile phone rotates about the central axis "A" of the protrusion 201 according to the vibration, which rotational movement serves to visibly notify the user of the reception of the call signal from a distance.

The rotational axes "A" and "B" are perpendicular to the upper or underside of the mobile phone. The protrusion 201 is preferably formed integral with the casing of the battery pack 20. The shape of the protrusion is preferably spherical to minimize the frictional resistance to the surface where the mobile phone is placed. The process of notifying the user of the reception of a call signal in a mobile phone set to the vibration mode is achieved in two ways. One method makes the user tangibly or audibly sense the vibration as the mobile phone is carried by the user or placed on a flat surface like the flat surface of a table, and the other method makes the user visibly sense the rotational movement of the mobile phone caused by the vibration.

Figure 3:
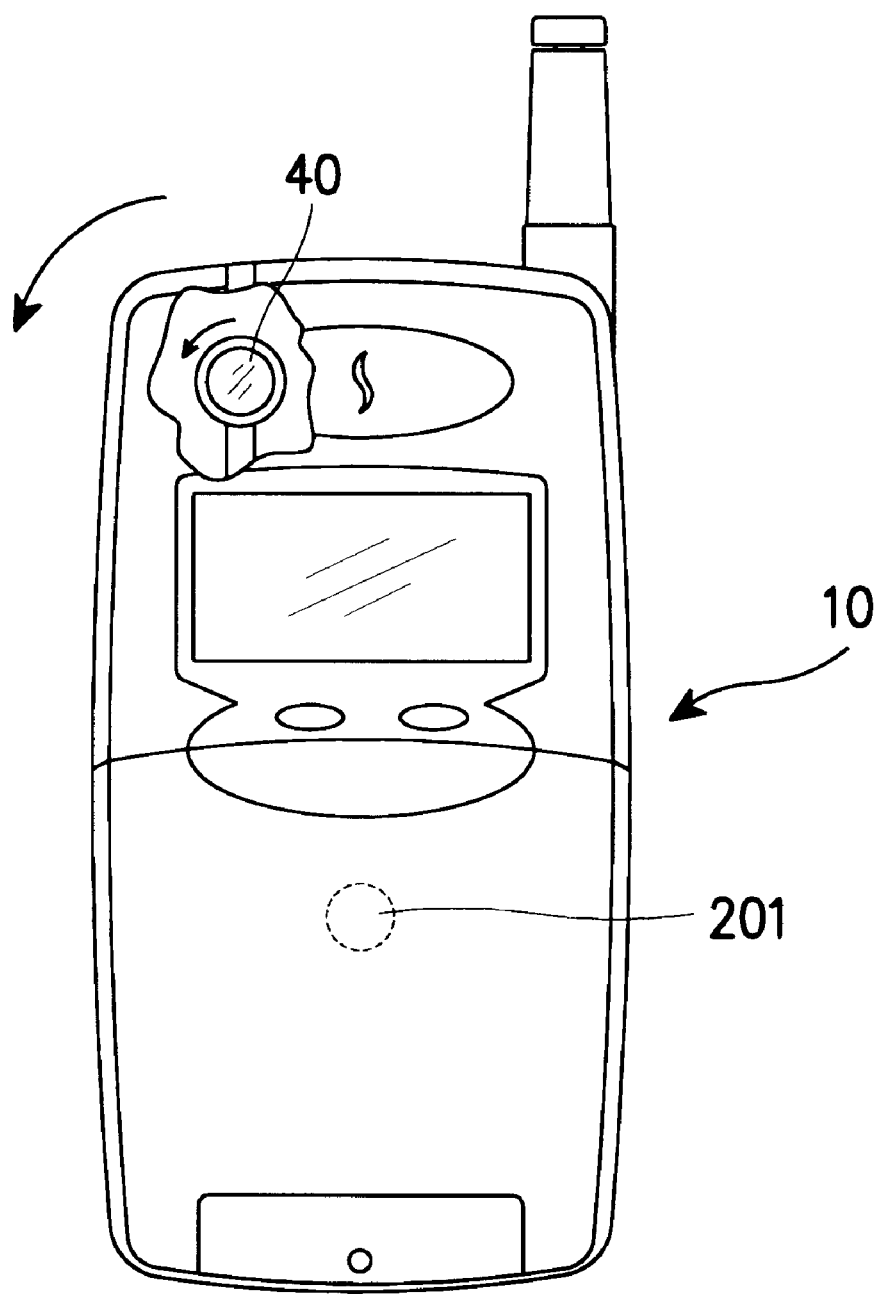
FIGS. 3 and 4 are plan views for illustrating the rotation of the mobile phone made in the same direction as that of the vibrator's rotor according to the present invention.
Figure 4:
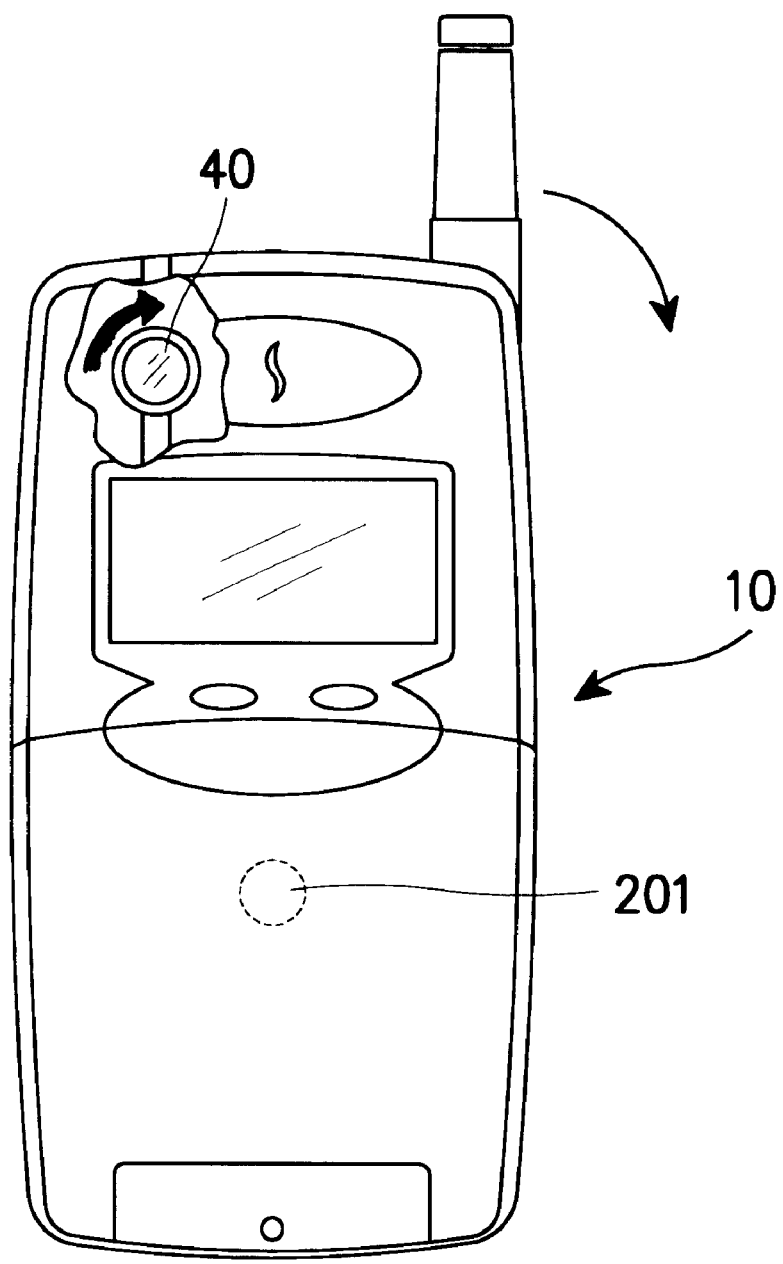

Referring to FIGS. 3 and 4, when the mobile phone in vibration mode is placed on a desk and receives a call signal, the vibration of the vibrator 40 is transmitted to the body 10 of the mobile phone. The mobile phone is therefore rotated about the protrusion 201 in response to the rotation of the rotor provided in the vibrator 40, and this rotation visibly notifies the user of the call. Namely, the torque of the rotor is transmitted to the body 10 of the mobile phone. Accordingly, the mobile phone rotates in the same direction as that of the rotor, i.e., clockwise or counterclockwise. Of course, the RPM of the rotor may be selected so as to generate a desirable frequency for the user.

The inventive device may be applied to any kind of mobile radio terminal including folder-type, bar-type and flip-type mobile phones, and a pager. The protrusion providing the mobile phone with a rotational axis may be formed on the upper surface of the mobile phone at its weight center instead of the outer surface of the battery pack. In addition, the rotational direction of the rotor may be made to alternate between clockwise and counterclockwise.

While the present invention has been described in connection with specific embodiments accompanied by the attached drawings, it will be readily apparent to those skilled in the art that various changes and modifications may be made thereto without departing from the spirit and scope of the present invention.

What is claimed is:

1. A device for notifying the user of a mobile phone of the reception of a call signal, comprising:

a vibrator mounted in the body of said mobile phone to make a vibration tangibly sensed by the user when said call signal is received by said mobile phone;

a battery pack detachably attached to said body to supply power to said mobile phone; and a protrusion formed on an outer surface of said body at the weight center of said mobile phone, whereby said mobile phone is rotated about said protrusion upon receiving said call signal.

2. The device as defined in claim 1, wherein said vibrator is a coin type.

3. The device as defined in claim 1, wherein said protrusion faces a support surface when said mobile phone is placed on said surface.

4. The device as defined in claim 1, wherein said protrusion is spherical.

5. The device as defined in claim 1, wherein said protrusion is formed integral with said battery pack.

6. A method for notifying the user of a mobile phone of the reception of a call signal, the mobile phone having a vibrator having a rotor mounted in the body of said mobile phone to make a vibration tangibly sensed by the user when said call signal is received by said mobile phone, a battery pack detachably attached to said body to supply power to said mobile phone, and a protrusion formed on the outer surface of said battery pack at the weight center of said mobile phone, the method of notifying said user of the reception of said call signal comprising the steps of:

causing said vibrator to vibrate to tangibly or audibly notify said user when said mobile phone is set to a vibration mode of the reception of a call signal; and making said mobile phone rotate about said protrusion in response to said vibration so as to visibly notify said user of the reception of said call signal.

7. The method as defined in claim 6, wherein the rotational direction of said mobile phone is the same as that of said rotor.

* * * * *